Feb. 7, 1967 G. R. LEVEN 3,302,310

TEACHING DEVICE

Filed May 18, 1964

Inventor:
Gloria R. Leven
By: Sol L. Goldstein, Atty

United States Patent Office 3,302,310
Patented Feb. 7, 1967

3,302,310
TEACHING DEVICE
Gloria R. Leven, 718 Forest Ave., Evanston, Ill. 60202
Filed May 18, 1964, Ser. No. 368,121
9 Claims. (Cl. 35—35)

This invention relates to a teaching device and more particularly to a kinesthetic device capable of teaching the rudiments of reading.

One of the basic requirements essential for learning to read is the ability of the student to discriminate words and what they represent. One of the techniques usually employed to teach this skill is the science of phonics.

In the teaching of reading, a wide variety of methods and aids have been employed where the student goes through exercises of matching words with pictures, or letters, diagraphs and blends with pictures. The student usually performs these written exercises under the supervision of an instructor and requires that each exercise be checked and corrected.

Various other exercises, games and pictorial techniques have been used to teach phonics but they have been deficient in that the student does not immediately learn of any mistakes, but must depend on the teacher to check the results of his work.

It was found that different exercises had to be used to meet different levels of maturity. For example, in a typical phonics exercise, the student was shown the letter "b" and required to coordinate pictures with words whose initial consonants are "b." Depending on the maturity or experience, some students would be unable to make the necessary discrimination.

This instant invention combines the physical act of putting elements together in a predetermined manner which unmistakably coordinate a specific alphabetical representation with both the word and its pictorial equivalent. The elements must physically fit together before they make up an array of phonetically coordinated elements.

It is a primary object of this invention to provide an improved teaching aid for students learning to read.

It is a specific object of this invention to provide a teaching device whereby the student selects and puts together indicia-bearing elements which match alphabetical symbols with their word or pictorial equivalents.

It is a further object of this invention to provide a teaching device which is self-checking, requiring the student to physically fit together indicia-bearing, two sided elements in a predetermined array which when completed, associates the proper word with an alphabetical representation on one side of the element, or a pictorial representation on the reverse side.

It is a further object of this invention to provide a teaching device which is inexpensive, self-checking and holds the interest of the student in learning phonics.

Many other objects and advantages of the present invention will become apparent from considering the following detailed description in conjunction with the drawings in which.

Figures 1, 2, 3:
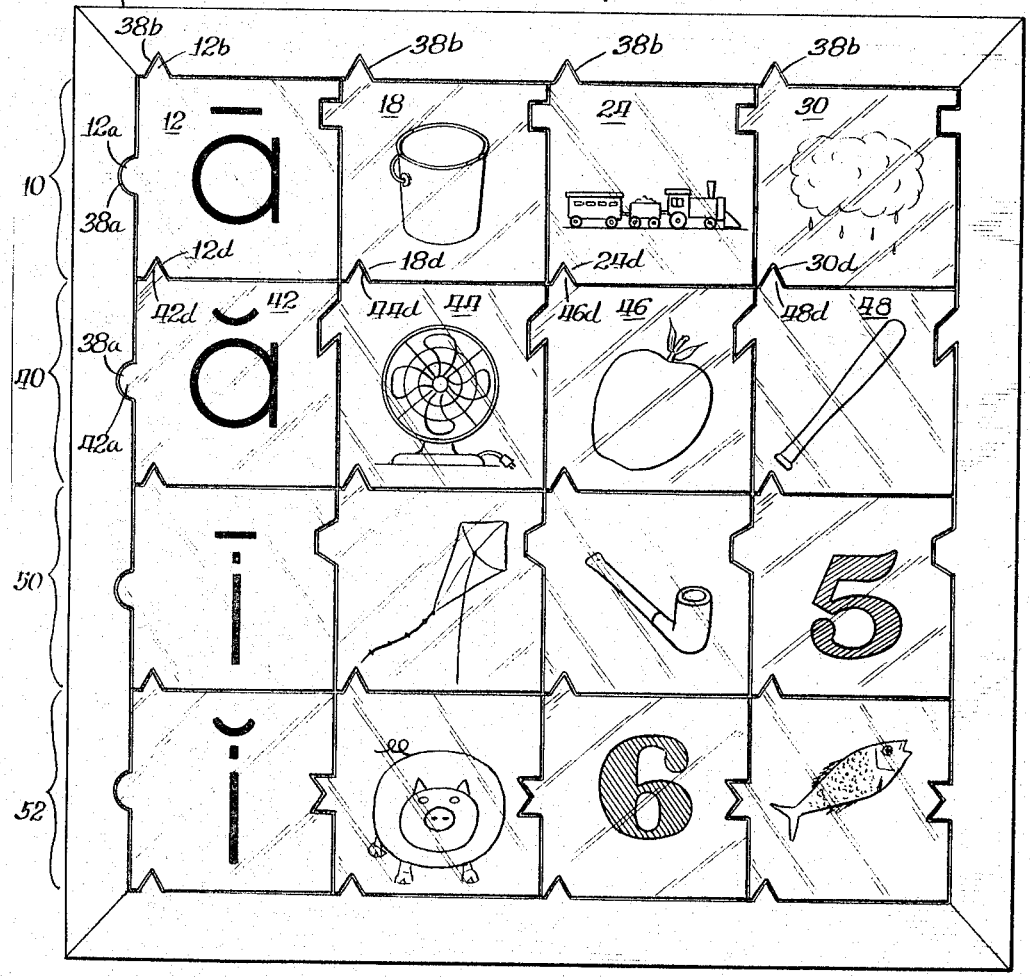
FIG. 1 is an illustration of a typical array of coordinated elements in position ready to be interlocked.
FIG. 2 is an illustration of the reverse side of the array shown in FIG. 1.
FIG. 3 shows a completed panel formed of several arrays.

Referring now more specifically to FIGS. 1 and 2 of the drawings, there is illustrated a basic arrangement of elements, which are very much like puzzle pieces, capable of interlocking with one another in a predetermined manner to form an array identified generally as 10. The array 10 when pieced together associates to letter or letter combinations with pictures or with the words whose spelling start with the letter or use the letter combination.

The elements are marked on both sides. The first or lead element 12 bears identical markings on each of its sides 14 and 16 comprising a letter of the alphabet or letter combinations. In FIG. 1 and FIG. 2 the first element 12 teaches the "long a" sound.

A letter or combination of letters, representing initial consonants, syllabic word endings, diagraphs or blends must be matched with elements having the word utilizing the representation or the picture representing the word.

Each of the other elements in the array bears a picture on one side and its word equivalent on the reverse side. Element 18 is shown with a picture of a "pail" on side 20 and the word spelled out on the reverse side 22. Each of the sides of element 24 have indicia thereon, with a picture of a "train" on side 26 and the word on side 28. The last element 30 in the array depicts "rain" on side 32 and the word equivalent on the other side 34.

The number of elements to be matched with the lead element need not be restricted to any specific number. It is only necessary that the student be exposed to enough word and picture illustrations of a particular letter or combination of letters to establish the phonetic relationship. This could be anywhere from 3 to 6 coordinating elements.

Each of the elements 12, 18, 24 and 30 have particularly shaped tab portions and cut out portions associated with their edges. The tab portions are adapted to be received into cut out portions, thereby interlocking the coordinating elements with one another and each being capable Tab portions 12a and 12b extend laterally from the of interlocking in turn with the first element 12.
edge of element 12, along with the cut out portions 12c and 12d. Element 18 is provided with tab portions 18c and 18b and cut out portions 18a and 18d. Similarly elements 24 and 30 have tabs 24a, 24b, 30c and 30b and cut out portions 24c, 24d, 30a and 30d respectively.

The tabs 18c, 24a, 30c are shaped so that they each can interchangeably be received into the cut out portion 12c. As coordinating elements, 18, 24 and 30 can combine with one another in any order since the cut out portions 18a, 24c, and 30a can interlock with any of the tabs 18c, 24a and 30c.

The function of the other tabs and cut out portions will be described in detail later in the discussion of FIG. 3.

In operating the teaching device, the student is confronted with a number of unattached, individual elements. The student will attempt to combine the elements with one another to form a completed array. Only certain of the elements will fit together to yield the completed array as shown in FIG. 1 or 2 coordinated with the lead element. It will readily be appreciated that the student unmistakably fits the proper elements together associating the word or picture elements with the lead element.

When the student observes the picture and calls it by name he will automatically learn the "long a" sound. By turning over the element he learns the spelling of the word representing the picture. In the circumstance where he observes the word side first the picture will enable him to recognize the word using the "long a" sound.

This technique will readily be recognized as being employed in the teaching of reading by phonics.

In FIG. 3 there is shown a completed panel comprising a rectangular framing member 38 adapted to receive various arrays forming completed rows within the frame. The arrays fit into the frame 38 in a predetermined manner so that each of the first elements form a vertical column within the frame along the one edge thereof.

A series of cut out portions 38a and 38b are provided along the adjacent inside edges of the frame. Array 10 is shown fitted into place as the top row of the panel through the tabs 12a, 12b, 18b, 24b and 30b interlocked with the corresponding cut out portions 38a and 38b. The first element starts the row.

The next row in the panel is comprised of the completed array 40, teaching the sound of the "short a." The array is formed by interlocking the first element 42 with the frame 38 through tab 42a with cut out 38a. Vertically the coordinated elements 42, 44, 46 and 48 interlock with elements 12, 18, 24 and 30 through the tabs 42d, 44d, 46d and 48d being received into the cut outs 12d, 18d, 24d and 30d respectively.

Similarly, the arrays 50 and 52 complete the arrangement of rows and columns. The array 50 illustrates the "long i" sound and 52 the "short i" sound. The first element of each array is matched with the coordinating elements being fitted into their predetermined position as established by the various shaped tabs and matching cut out portions.

The panel may be completed showing the word representations instead of the pictorial representations by merely turning it over so that the cut out portions 38b are along the bottom of the frame, with the portions 38a still along the left hand edge. The array 10 (FIG. 3) when it is turned over will appear as shown in FIG. 2. More specifically, referring to FIG. 3 the word "train" on side 26 of element 24 is shown as it would appear when element 28 in the array of FIG. 2 is turned over and fitted into the bottom portion of frame 38.

The use of the "b" and "d" interlocks, which serve to interlock the arrays with one another are particularly useful where either side of the frame 38 is to be used.

The frame 38 may also be fabricated with a backing so that it is accessible from only one side. In this circumstance either side of the first elements will fit into the frame since the "a" tab portions are disposed midway along the edge of the element. The "b" and "d" tabs in this instance may be omitted from the elements.

It has been found advantageous to color co-ordinate the elements comprising a particular panel.

As a phonics teaching device this arrangement of interlocking word and picture bearing elements in a predetermined manner also provides a worthwhile source of entertainment.

Primary grade students find interest in the kinesthetic technique of selecting and fitting the pieces together. Auditory and visual perception are employed on the part of the student in fitting the pieces together into a completed array and finally into a panel unit.

The pieces fit together in only one way. This avoids errors. A wrong selection and the student at once knows that the improper word or picture has been selected because he cannot effect an interlock between said elements.

The device is effective for teaching a wide range of maturity in students. It can be utilized to teach students having various levels of experience.

The device is inexpensive, simple to operate and self teaching.

Although the present invention has been described with reference to a single illustrative embodiment thereof, it should be understood that numerous other modifications and embodiments can be devised to take advantage of the interlocking feature herein disclosed and that will fall within the spirit and scope of the principles of this invention.

What is claimed and desired to be secured by Letters Patent of the United States is:

1. A kinesthetic teaching device for learning to read comprising a series of indicia-bearing members comprising a set of first elements having alphabetic representations thereon, a set of coordinate elements having pictorial indicia thereon representing word equivalents, the alphabetic representation on each of said first elements being contained in a preselected member of the word equivalent of said pictorial representations, interlocking means on each of said first elements and coordinate elements to interlock at least one of said coordinate elements with a predetermined first element to form an array, said array being characterized in that the alphabetic representations on said first element phonetically corresponds to the pictorial representation on said coordinate element whereby a kinesthetic match of the elements may be interlocked.

2. A kinesthetic teaching device for learning to read comprising a series of two sided indicia bearing members comprising a set of first elements having alphabetic representations thereon, a set of coordinate elements having pictorial indicia on one side thereof and the word equivalent on the reverse side, the alphabetic representations on each of said first elements being contained in a preselected member of the word equivalent on said coordinate element, interlocking means on each of said first elements and coordinate elements to interlock said coordinate elements with a predetermined first element to form an array, said array being characterized in that the alphabetic representations on said first element phonetically corresponds to the pictorial representations on said coordinate element whereby a kinesthetic match of the elements may be interlocked.

3. The device as claimed in claim 2 wherein said first elements have the same alphabetic representations on both sides.

4. A kinesthetic teaching device for learning to read comprising a set of first two-sided elements, each first element having an alphabetic representation on both sides, the representations on both sides of the one element being the same, a set of coordinate two-sided elements having pictorial representations on one side and the word equivalent thereof on the reverse side, the alphabetic representation of each first element being contained in a preselected member of said word equivalents, and interlocking means on said first and coordinate elements to interlock each coordinate element containing the same alphabetic representation with each other and with the first element having that alphabetic representation to form an array.

5. A kinesthetic teaching device for learning to read comprising a set of first two-sided elements, each first element having an alphabetic representation on both sides, the representations on both sides of the one element being the same, a set of coordinate two-sided elements having pictorial representations on one side and the word equivalent thereof on the reverse side, the alphabetic representation of each first element being contained in a preselected member of said word equivalents, and interlocking means on said first and coordinate elements to interlock each coordinate element containing the same alphabetic representation with each other and with the first element having that alphabetic representation to form an array, said arrays interlocking with one another through the interlocking means on said first and coordinate elements to form a panel of said interlocked arrays.

6. The device described in claim 1 wherein the indicia on said first elements comprise the vowel members of the alphabet.

7. The device described in claim 1 wherein the indicia on said first element comprise the consonant members of the alphabet.

8. The device described in claim 1 wherein the indicia on said first element comprise syllabic word endings.

9. The device described in claim 5 wherein said arrays interlock into a frame means.

References Cited by the Examiner
UNITED STATES PATENTS

| | | | |
|---|---|---|---|
| 1,755,853 | 4/1930 | Waring | 35—35 |
| 2,529,321 | 11/1950 | Warren | 273—157 |
| 2,875,531 | 3/1959 | Mansfield | 35—73 X |
| 2,953,380 | 9/1960 | Hassenbach | 35—73 X |

EUGENE R. CAPOZIO, *Primary Examiner.*

W. GRIEB, *Assistant Examiner.*